United States Patent
Owens et al.

(10) Patent No.: US 7,136,393 B2
(45) Date of Patent: Nov. 14, 2006

(54) INFORMATION TRANSMISSION SYSTEM AND METHOD OF DATA TRANSMISSION

(75) Inventors: Tara E. Owens, Mary Esther, FL (US); Timothy L. Boolos, Mary Esther, FL (US); David Harding, Inglis, FL (US)

(73) Assignee: Northrop Grumman Coporation, Los Angeles, CA (US)

( * ) Notice: Subject to any disclaimer, the term of this patent is extended or adjusted under 35 U.S.C. 154(b) by 910 days.

(21) Appl. No.: 10/199,839

(22) Filed: Jul. 19, 2002

(65) Prior Publication Data
US 2004/0013131 A1 Jan. 22, 2004

(51) Int. Cl.
*H04J 11/00* (2006.01)
*H04J 1/00* (2006.01)

(52) U.S. Cl. ...................... 370/466; 370/489
(58) Field of Classification Search ............... 370/466, 370/467, 257, 401, 402
See application file for complete search history.

(56) References Cited

U.S. PATENT DOCUMENTS

| | | |
|---|---|---|
| 4,438,519 A | 3/1984 | Bose |
| 4,641,322 A | 2/1987 | Hasegawa |
| 5,290,191 A | 3/1994 | Foreman et al. |
| 5,970,395 A * | 10/1999 | Weiler et al. ............ 455/67.13 |
| 6,127,939 A | 10/2000 | Lesesky et al. |
| 6,289,000 B1 * | 9/2001 | Yonge, III ................. 370/203 |
| 6,496,509 B1 * | 12/2002 | Fant .......................... 370/400 |
| 6,873,620 B1 * | 3/2005 | Coveley et al. ........ 370/395.31 |
| 2003/0067934 A1 * | 4/2003 | Hooper et al. ............. 370/428 |

* cited by examiner

*Primary Examiner*—Brian Nguyen
(74) *Attorney, Agent, or Firm*—Tarolli, Sundheim, Covell & Tummino LLP

(57) ABSTRACT

The invention is a data transmission medium and a method of data transmission. A data transmission system in accordance with the invention includes a plurality of modems; a transmission medium coupled to each of the modems with data transmissions between the modems being transmitted by the transmission medium with a data transmission protocol; a plurality of processors which use a common processor data protocol, each processor being coupled to one of the modems; a plurality of devices, each device receiving and/or transmitting data transmissions with a device data protocol and being coupled to a processor; and a plurality of digital devices, coupled to the transmission medium, which perform at least one of transmitting digital data to the transmission medium for transmission by the transmission medium to another digital device and receiving digital data from another digital device transmitted by the transmission medium.

62 Claims, 7 Drawing Sheets

INFORMATION TRANSMISSION SYSTEM AND METHOD OF DATA TRANSMISSION

CROSS-REFERENCE TO RELATED APPLICATION

Reference is made to U.S. patent application Ser. No. 09/908,104 filed on Jul. 18, 2001, entitled "Power Bus Information Transmission System and Method of Data Transmission", now abandoned, which application is incorporated herein by reference in its entirety.

Reference is also made to related application Ser. No. 10/199,814, filed concurrently herewith, entitled "Connection System for Connecting Data Transmitting and Receiving Devices to Data Transmission Medium", now abandoned.

BACKGROUND OF THE INVENTION

1. Field of the Invention

The present invention relates to data transmission over a transmission medium, such as a power bus or digital data bus of a system, between devices of the system such as the transmission of data between at least one new device added to an airframe and other devices of the airframe.

2. Description of the Prior Art

It is known that the power bus of a system, such as a vehicle, may be used to transmit information between components of the system by transmitting a modulated carrier over the bus, which contains information to be transmitted between the components. See U.S. Pat. Nos. 4,438,519, 4,641,322 and 6,127,939.

FIG. 1 illustrates a prior art connector 200 used in airframes. The connector 200 has a female connector 202, which is connected to a power bus of the airframe and a male connector 204 which is connected to a device (not illustrated) in the airframe, such as avionics, line replaceable units (LRUs) or munitions. The connector 200 may be a MIL-STD-1553 connector or a MIL-STD-1760. Electrical power may be provided to the device through the mated connectors 202 and 204.

The male connector 204 has a series of pins 207 which are connected to conductors (not illustrated) which enter through back plane 206 which is part of a device connector. The pins 207 project from an insulative insert 208, which is held in metallic ring 209. The insert may be rubberized and flexible. The insert 208 has a series of through holes 210 which provide a pass through for conductors (not illustrated), which do not mate with the sockets 213 of the female connector 202.

The female connector 202 also has a rubberized insulative insert 211 held in a metallic ring 212. The insulative insert 211 has the sockets 213 aligned with and receiving the pins 207. However, the number of sockets 213 may be larger in number than the number of pins. The sockets 213, which receive one of the pins 207, contain a metallic receptacle (not illustrated) electrically contacting the pin. The sockets 213 are electrically connected to conductors (not illustrated) extending out of the back side and individually are contained in the wiring bundle 214. Through holes 216 are aligned with through holes 210 of the male connector to complete the pass through of conductors (not illustrated).

The retrofitting of an aircraft to add new equipment, LRUs and/or munitions, including new wiring, is a complex process, which can require many months of modification time and involve substantial expense. When new digital devices are added to after market military or commercial aircraft, the addition thereof typically requires new bus wiring or an expanded load on the already heavily loaded aircraft wiring cockpit applications. New devices, that may only require minutes to install, often require an entire airframe to be nearly disassembled to allow new wiring runs to the new devices. Furthermore, the new wiring adds weight to the aircraft and takes up space which is always disadvantageous in any airframe design and is especially so with high performance airframes in which maneuverability is important.

Furthermore, new equipment, such as LRUs or munitions, which are retrofitted to an airframe often require high bandwidth data links between the new equipment to points in the airframe where control or monitoring is performed. High bandwidth communications between state of the art digital equipments are necessary.

BRIEF SUMMARY OF THE INVENTION

The present invention provides a data transmission system and method, which may be utilized to connect at least one existing or new device of a system to at least one other device of the system, using a transmission medium which may be without limitation a power bus, a digital data bus or an optical transmission medium. When the invention is used to retrofit an existing system, such as an airframe, an existing power bus or digital data bus may be used. Alternatively, the present invention may be used with new systems in which the transmission medium is a power bus, digital data bus or an optical transmission medium. The devices which may be linked to the transmission medium for data transmission between at least one other device are diverse. The devices may, without limitation, be sensors, avionics, LRUs, munitions, displays and/or control electronics. The invention facilitates the addition of diverse types of new equipment or systems within an existing system without the addition of wiring to support the communication requirements thereof.

In accordance with a first embodiment of the invention, the power bus of a new or existing system, such as an airframe, may be configured to support transmission of data between devices which use a variety of bus interface standards, such as, but not limited to RS-422, MIL-STD-1553 including the revision with an enhanced bit rate of 10 Mbps, MIL-STD-1760 or ARINC 429. Data transmissions originating with or received by the devices utilize diverse bus interface standards, are bidirectional and are addressed to processors. The data transmissions between the addressable processors do not require transmission through a master controller.

In accordance with a second embodiment of the invention, a digital data bus of a new or existing system, such as an airframe, may be configured to support transmission of additional data between devices coupled to the digital data bus which does not interfere with transmission of digital data between other digital devices coupled to the digital data bus. The additional digital data may be transmitted to support a variety of bus interface standards, such as, but not limited to RS-422, MIL-STD-1553, including the version with an enhanced bit rate of 10 Mbps, MIL-STD-1760, or ARINC 429. The additional data transmissions originating with or received by the devices utilize diverse bus interface standards, are bidirectional and are addressed to processors. The data transmission protocol used for transmitting the additional digital data between the processors is selected to prevent interference with the data transmission protocol used for the transmission of digital data over the digital data bus between other digital devices. The selection of data transmission protocols, includes without limitation multiplexing protocols, such as frequency or time division multiple access multiplexing protocols. For example, the additional digital data may be transmitted in a different frequency band than the digital data transmitted between the other digital devices with the additional data being, for example, in a higher frequency band. The additional data may be transmitted without limitation by orthogonal frequency division multiplexing (OFDM). The data transmissions do not require a master controller.

In accordance with a third embodiment of the invention, an optical transmission medium may be configured to transmit the same data as described above with regard to the use of existing and new power buses and digital data buses as described above with reference to the first and second embodiments.

A connection system in accordance with the invention, includes a housing, which contains a stack of circuit boards including a modem board and a processor board which is used to provide connection of devices to a transmission medium of the three embodiments described above. Each processor board includes a processor, which translates data transmissions into a device data protocol which data transmissions are received from an associated device into a common processor protocol. The data transmissions in the common processor protocol are transmitted to a modem in a modem board coupled thereto. The processor translates data transmissions received from the modem board coupled thereto in the common data processor protocol into the device data protocol of the associated device coupled thereto. The data transmissions in the device data protocol are transmitted to the associated device coupled thereto. Each modem board includes a modem which modulates data transmissions received from the processor coupled thereto in the common processor protocol into the data transmission protocol which data transmissions are transmitted by the transmission medium to another device. Each modem board demodulates data transmissions received from another modem in the data transmission protocol into the common processor protocol and transmits the data transmissions in the common processor protocol to the processor board coupled thereto. A power supply in a power supply board is preferably present in the stack of boards, which provides regulated electrical power to the other circuit boards coupled thereto. Additionally, a device interface may be included in the stack of boards to provide an interface between the associated device, which may operate with any one of many diverse bus interface standards including those mentioned above. The device interface is coupled to the processor board and modifies timing of data transmissions between the associated device and the processor board coupled thereto and/or buffers the data transmissions between the associated device and the processor coupled thereto and may convert data transmission outputs from the associated device coupled thereto into a configuration matching integrated circuit inputs or printed circuits of the processor board coupled to the device interface.

Each circuit board of the stack of circuit boards may be powered by a power supply, which obtains electrical power from the system containing the power bus which, in an airframe, typically converts the 120 volt, 400 Hz. AC power into the appropriate AC or DC potentials necessary to operate the power bus data transmission system. Without limitation, the power supply may provide any of the DC voltages required for electronics operation that are obtained from rectification of the aforementioned 120 volt, 400 Hz, AC power supply typically present on an airframe.

While a preferred implementation of the present invention is on airframes, such as military aircraft, the present invention may be used in diverse applications, such as the retrofitting of new equipment having substantial data transmission or reception requirements without invasive effects or substantial modification of the system including, but not limited to, the addition of new wiring. The invention may also be practiced with the installation of new transmission media and for transmission of data over the new media.

A data transmission system in accordance with the invention includes a plurality of modems; a transmission medium coupled to each of the modems with data transmissions between the modems being transmitted by the transmission medium with a data transmission protocol; a plurality of processors which use a common processor data protocol, each processor being coupled to one of the modems; a plurality of devices, each device receiving and/or transmitting data transmissions with a device data protocol and being coupled to a processor; a plurality of digital devices, coupled to the transmission medium, which perform at least one of transmitting digital data to the transmission medium for transmission by the transmission medium to another digital device and receiving digital data from another digital device transmitted by the transmission medium; and wherein each processor translates data transmissions in a device data protocol received from a device into the common processor protocol which are transmitted to a modem coupled thereto and translates data transmissions received from the modem coupled thereto in the common data processor protocol into the device data protocol of the device coupled thereto which is transmitted to the device coupled thereto and each modem modulates data transmissions received from the processor coupled thereto into the data transmission protocol which are transmitted by the transmission medium and demodulates data transmissions received from another modem in the data transmission protocol into the common processor protocol and transmits the data transmission in the common processor protocol to the processor coupled thereto and data transmissions on the transmission medium using the data transmission protocol do not interfere with data transmissions on the transmission medium between the plurality of digital devices. The transmission of digital data on the transmission medium between the digital devices may be separated in frequency from the transmission of data by the transmission medium using the data transmission protocol. The digital data is transmitted on the transmission medium between the digital devices may be in a first frequency band and the transmission of data by the transmission medium using the data transmission protocol may be in a second frequency band different from the first frequency band. The first frequency band may be lower in frequency than the second frequency band. The data transmission protocol may be orthogonal frequency division multiplexing. The transmission medium may be a digital data bus. A plurality of device interfaces may be provided with each device interface being coupled to a device and a processor and modifying timing of data transmissions between the device and processor coupled thereto and/or buffering the data transmissions between the device and the processor coupled thereto. Each device interface may convert data transmission outputs from the device coupled thereto into a configuration to match integrated circuit inputs of the processor coupled to the interface. The common processor data protocol may be IP. The device data protocol may be RS-422, MIL-STD-1553, including the version with an enhanced bit rate of 10 Mbps, MIL-STD-1760, or ARINC 429. The transmission medium may be on an airframe; and the devices and digital devices may be equipment of the airframe. The devices may be munitions or avionics. The transmission medium may be an optical transmission medium.

A method of data transmission using a data transmission system including a plurality of modems, a transmission medium coupled to each of the modems with data transmissions between the modems being transmitted by the transmission medium using a data transmission protocol, a plurality of processors which use a common processor data protocol, each processor being coupled to one of the modems, a plurality of devices, each device receiving and/or transmitting data transmissions with a device data protocol and being coupled to a processor, and a plurality of digital devices coupled to the transmission medium which perform at least one of transmitting digital data to the transmission medium for transmission by the transmission medium to another digital device and receiving digital data from another digital device transmitted by the transmission medium in accordance with the invention includes each processor translating data transmissions in a device protocol received from a device into the common processor protocol which are transmitted to a modem coupled thereto and translating data transmissions received from the modem in the common data processor protocol into the device data protocol of the device coupled thereto which is transmitted to the device coupled thereto; and each modem modulates data transmissions received from the processor coupled thereto into the data transmission protocol which are transmitted by the transmission medium and demodulates data transmissions received from another modem in the data transmission protocol into the common processor protocol and transmits the data transmissions in the common processor protocol to the processor coupled thereto and wherein data transmissions on the transmission medium using the data transmission protocol do not interfere with the data transmissions on the transmission medium between the plurality of digital devices. The transmission of digital data on the transmission medium between the digital devices may be separated in frequency from the transmission of data by the transmission medium using the data transmission protocol. The digital data is transmitted on the transmission medium between the digital devices may be in a first frequency band and the transmission of data by the transmission medium using the data transmission protocol may be in a second frequency band different from the first frequency band. The first frequency band may be lower in frequency than the second frequency band. The data transmission protocol may be orthogonal frequency division multiplexing. The transmission medium may be a digital data bus. A plurality of device interfaces may be provided with each device interface being coupled to a device and a processor and modifying timing of data transmissions between the device and processor coupled thereto and/or buffering the data transmissions between the device and the processor coupled thereto. Each device interface may convert data transmission outputs from the device coupled thereto into a configuration to match integrated circuit inputs of the processor coupled to the interface. The common processor data protocol may be IP. The device data protocol may be RS-422, MIL-STD-1553 including the version with an enhanced bit rate of 10 Mbps, MIL-STD-1760, or ARINC 429. The transmission medium may be on an airframe; and the devices and digital devices may be equipment of the airframe. The devices may be munitions or avionics. The transmission medium may be an optical transmission medium.

A data transmission system in accordance with the invention includes a plurality of modems; a transmission medium coupled to each of the modems with data transmissions between the modems being transmitted by the transmission medium with a data transmission protocol; a plurality of processors which use a common processor data protocol, each processor being coupled to one of the modems; a plurality of devices, each device receiving and/or transmitting data transmissions with a device data protocol and being coupled to a processor; and wherein each processor translates data transmissions in a device data protocol received from a device into the common processor protocol which are transmitted to a modem coupled thereto and translates data transmissions received from the modem coupled thereto in the common data processor protocol into the device data protocol of the device coupled thereto which is transmitted to the device coupled thereto and each modem modulates data transmissions received from the processor coupled thereto into the data transmission protocol which are transmitted by the transmission medium and demodulates data transmissions received from another modem in the data transmission protocol into the common processor protocol and transmits the data transmission in the common processor protocol to the processor coupled thereto and data transmissions on the transmission medium using the data transmission protocol do not interfere with data transmissions on the transmission medium between the plurality of digital devices. The transmission medium may be a power bus, a digital data bus, or an optical transmission medium.

A method of data transmission using a data transmission system including a plurality of modems, a transmission medium coupled to each of the modems with data transmissions between the modems being transmitted by the transmission medium using a data transmission protocol, a plurality of processors which use a common processor data protocol, each processor being coupled to one of the modems, a plurality of devices, each device receiving and/or transmitting data transmissions with a device data protocol and being coupled to a processor, in accordance with the invention includes each processor translating data transmissions in a device protocol received from a device into the common processor protocol which are transmitted to a modem coupled thereto and translating data transmissions received from the modem in the common data processor protocol into the device data protocol of the device coupled thereto which is transmitted to the device coupled thereto; and each modem modulates data transmissions received from the processor coupled thereto into the data transmission protocol which are transmitted by the transmission medium and demodulates data transmissions received from another modem in the data transmission protocol into the common processor protocol and transmits the data transmissions in the common processor protocol to the processor coupled thereto and wherein data transmissions on the transmission medium using the data transmission protocol do not interfere with the data transmissions on the transmission medium between the plurality of digital devices. The transmission medium may be a power bus, digital data bus, or an optical transmission medium.

BRIEF DESCRIPTION OF THE DRAWINGS

Like parts are identified in a like manner throughout the drawings.

DETAILED DESCRIPTION OF THE INVENTION

Figure 2:
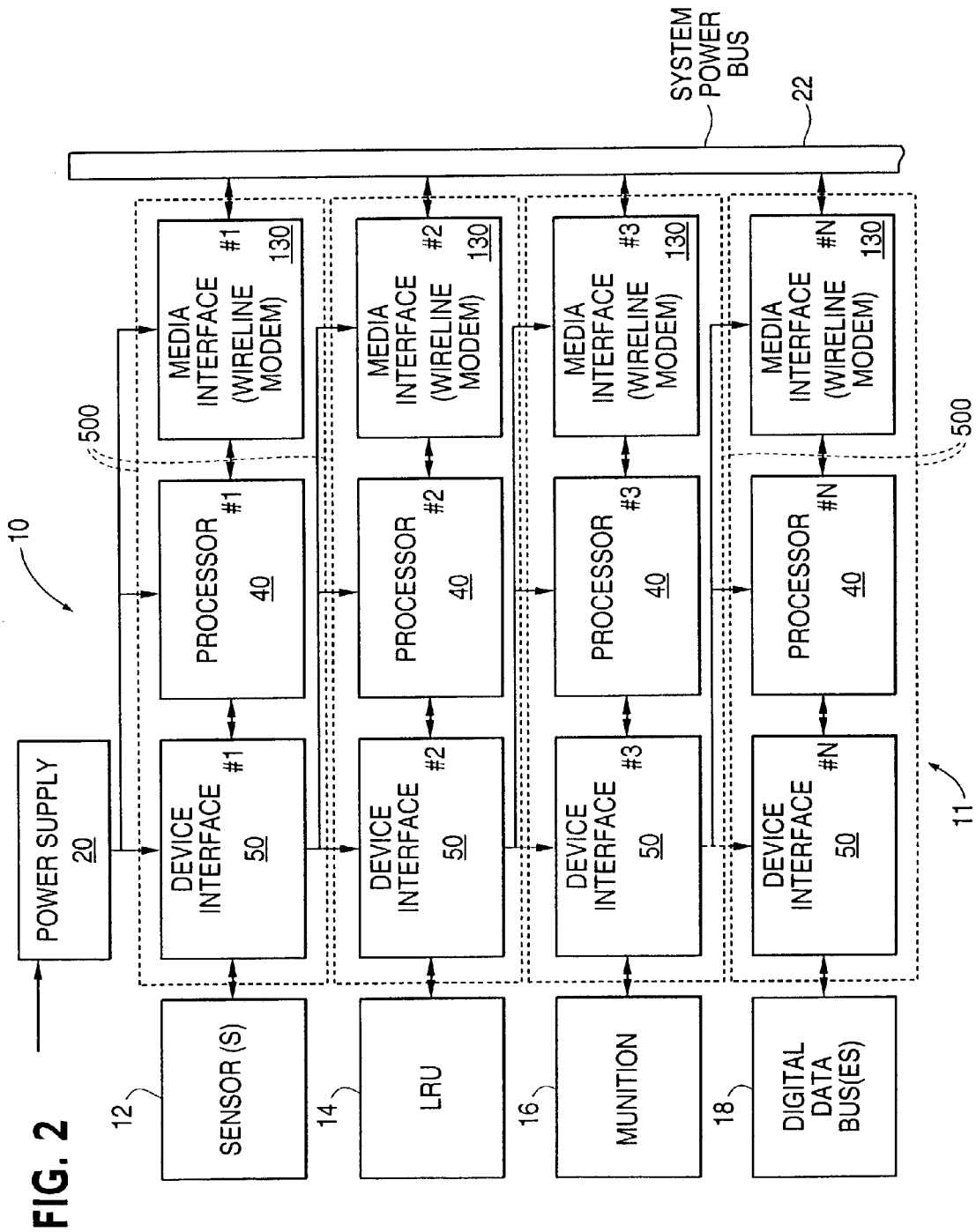
FIG. 2 illustrates a data transmission system in accordance with a first embodiment of the present invention.

FIG. 2 illustrates a first embodiment of the present invention of a data transmission system 10, which provides data transmission between devices in a system 11, which may be a new system or an existing system, to which the devices are connected over system power bus 22. The system 11 may, without limitation, be an existing airframe to which devices, such as new equipment, munitions, line replaceable units (LRUs), avionics, controls, digital devices, displays or systems are added thereto which have substantial data transmission or reception requirements satisfied by use of the system power bus 22.

Different types of existing or new devices may be connected to the system power bus 22. The devices may be sensors 12 providing communications between devices such as, but not limited to, vehicle controls such as new pilot controls and other devices in the system 11, LRUs 14, munitions 16 having wideband data communication bandwidth requirements, such as, at data rates up to 20 MHz, or digital data buses 18 representing sources of computer generated data in the system. The digital data busses 18 may have diverse bus interface standards, such as, but not limited to, RS-422, ARINC 429 and MIL-STDs-1553 including the version with an enhanced bit rate of 10 Mbps and 1760. Each of the devices 12, 14, 16 and 18 generate data in a native data mode, which may be unique in the system 11 and may be without limitation analog or digital data, including digital data encoded with a particular data bus protocol such as those identified above.

Figure 3:
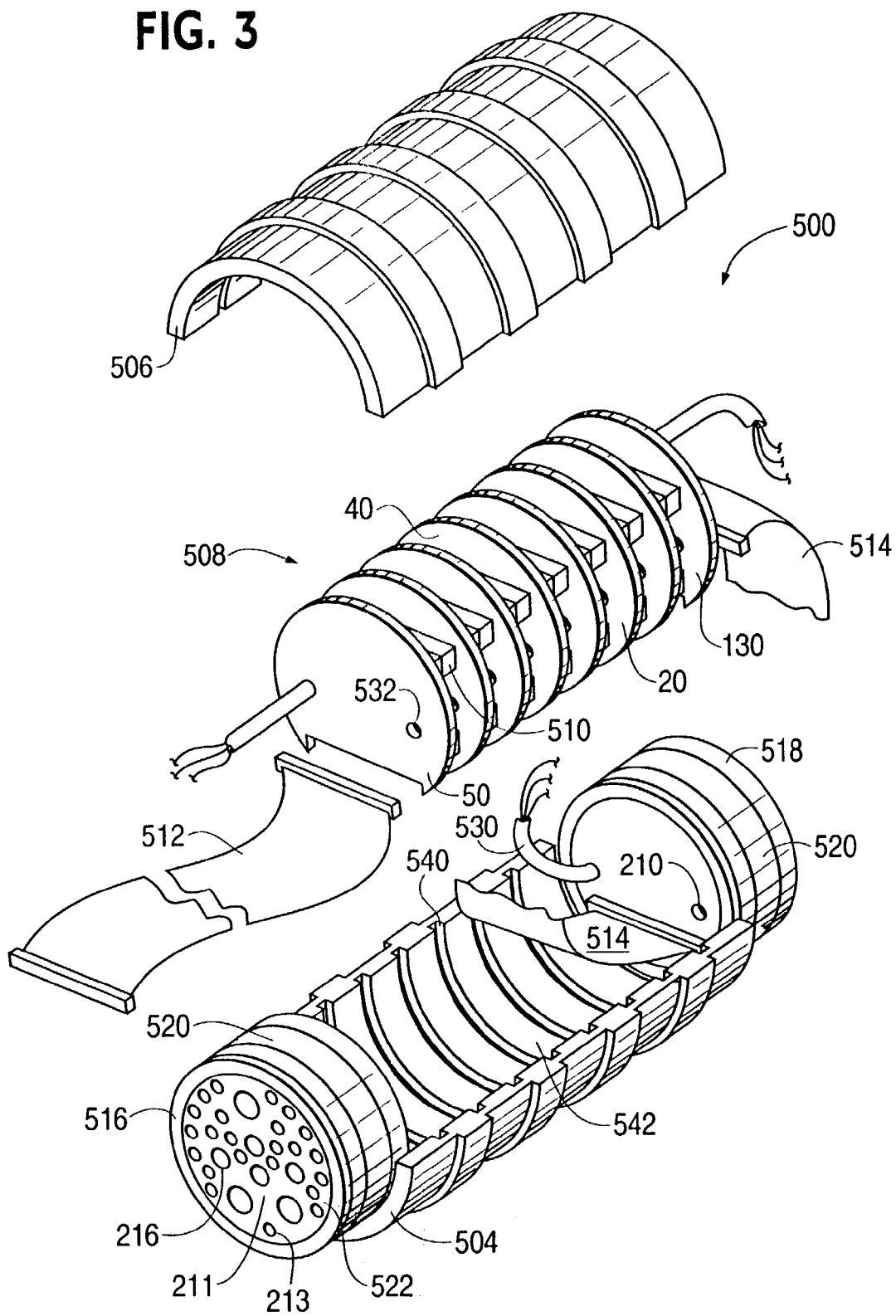
FIG. 3 illustrates an exploded view of a housing in a connection system for connecting an associated device containing a stack of circuit boards to a data transmission medium in accordance with the embodiments of the invention.
Figure 4:
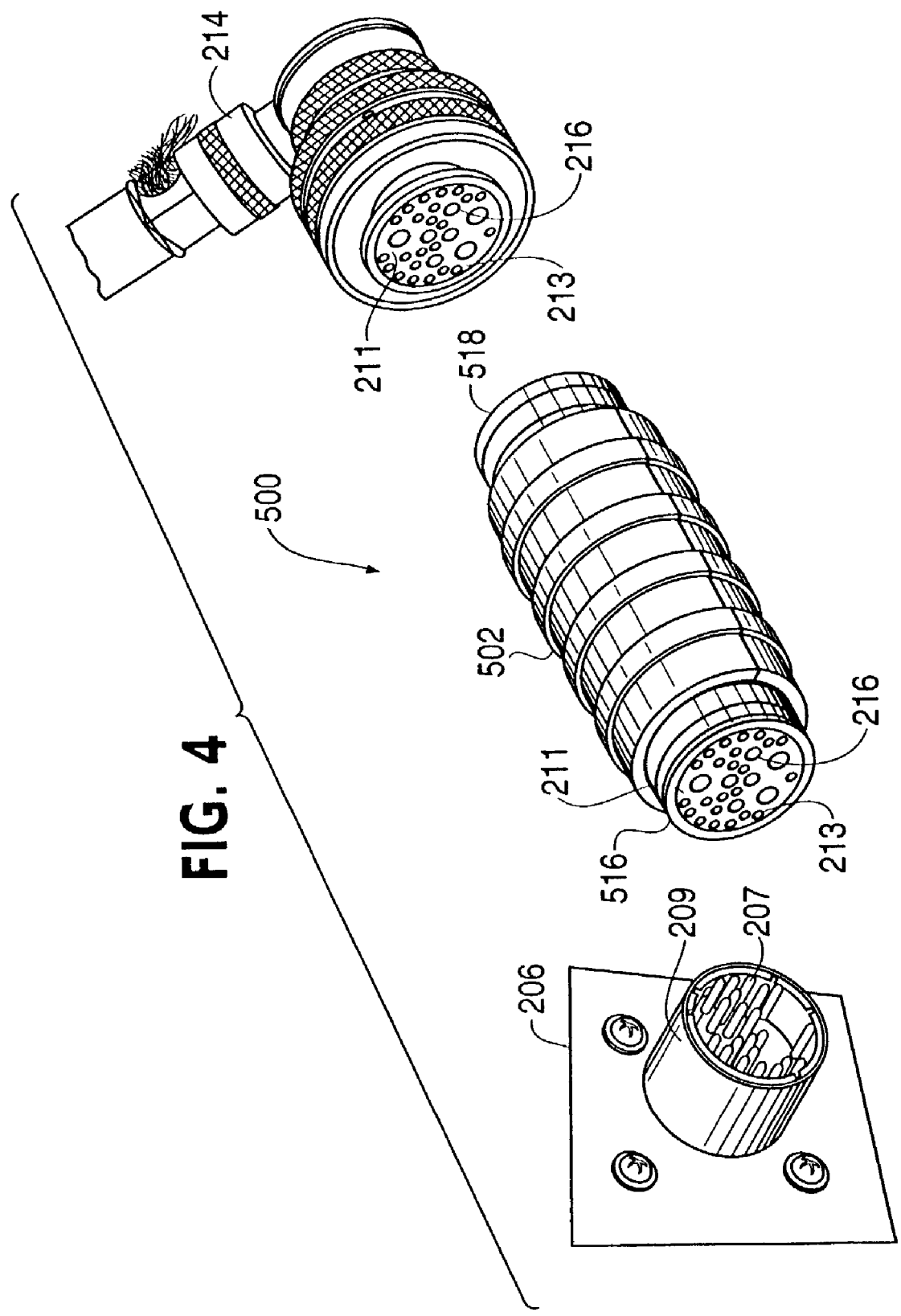
FIG. 4 illustrates the connection system of the present invention including the housing of FIG. 3 with associated connectors.

Power supply 20 converts the power from the existing system 11 into the electrical power required to operate the power bus data transmission system 10. The power supply 20, in a preferred application of the invention in airframes, without limitation, may utilize 28 volts DC, 270 volts DC, or as well as other voltages utilized conventionally in airframe applications. Power supply 20 may, without limitation, rectify AC, such as 400 Hz at 120 volts, into the aforementioned DC potentials for powering each of the components in the system. As illustrated, the power supply 20 is separated from the connection system 500 but it should be understood that the power supply may be integrated within the connection system as illustrated in FIGS. 3 and 4.

The power bus data transmission system 10 is based upon a distributed processor architecture including processors 40 associated with each device 12, 14, 16 and 18, which have addresses on the system power bus. Each processor 40 is coupled to an associated device interface 50 and a media interface 130 which functions as a modem. The processors 40 emulate the device data protocols which may be digital data bus specifications such as, without limitation, the aforementioned RS-422, ARINC 429 and MIL-STDs-1553 including the version with an enhanced bit rate of 10 Mbps and 1760 standards and others, including analog. The processor 40, interface 50 and media interface 130, in a preferred embodiment, are assembled into a housing 502 illustrated in FIGS. 3 and 4 which plugs into connectors to the devices 12, 14, 16 and 18 and to the system power bus 22 as illustrated in FIG. 2. The housing preferably includes the power supply 20.

Each of the processors 40 uses a common processor protocol, which, without limitation, may be the internet protocol (IP). The processors 40 convert all data transmissions from the devices 12, 14, 16 and 18, which are encoded in diverse native data protocols specific to the associated devices, into the common processor protocol. This permits communications from any device in the system 10 to be transmitted to any other device through an associated processor 40 coupled to the device to which the data transmission is addressed.

The bus emulation feature of the processors 40, which all operate in the common data processor protocol, permits all data transmissions to be compatibly processed which are received from any one of the devices 12, 14, 16 or 18. The processors convert the data transmissions received in the common processor protocol into the device data protocol of the associated device.

The system power bus 22, which may be in accordance with any known design, functions as the backbone data transmission network for transmitting bidirectional data transmissions between the devices 12, 14, 16 and 18. Bus contention to obtain access to the system power bus 22 for transmitting the bidirectional data transmissions between the processors 40 may be handled in accordance with IEEE specification 803.11 or by any other bus contention mechanism. The system power bus 22 uses a data transmission protocol for data transmissions between the modems 130 which may be, without limitation, orthogonal frequency division multiplexing (OFDM). OFDM is an adaptive modulation technique using spread spectrum technology supporting data rates up to 20 MHz. However, other protocols, including multiple access protocols, such as TDMA, may be used with equal facility.

The use of the existing system power bus 22 as the backbone data transmission network does not require modification or disassembly of the system 11, such as an airframe, except to make the physical connection of the processors 40, device interfaces 50 and modems 130, which may be packaged in a connection system 500 as illustrated in FIGS. 3 and 4, with or without the power supply 20 therein with an attendant labor and time savings. Weight savings are also realized by not adding new wiring to support the operation of the new devices 12, 14, 16 and 18.

Each device interface 50 is coupled to one of the devices 12, 14, 16 and 18 and to a processor 40. Each device interface 50 may, if required, modify timing of data transmissions between one of the devices 12, 14, 16 and 18 and the associated processor 40 coupled thereto and/or provide buffering of the data with memory storage therein and convert physical data transmission outputs to match integrated circuit inputs of the processor coupled thereto.

Each media interface 130, which functions as a modem, modulates the data transmissions, received from the associated connected processor 40 in the common data processor protocol used by all processors 40, into the data transmission protocol. The data transmissions, modulated in the data transmission protocol by the media interfaces 130, are transmitted by the system power bus 22. Each media interface 130 also demodulates the data transmissions received from other devices 12, 14, 16 and 18 over the system power bus 22 into the common processor protocol and transmits the demodulated transmissions to the associated processor 40.

Figure 1:
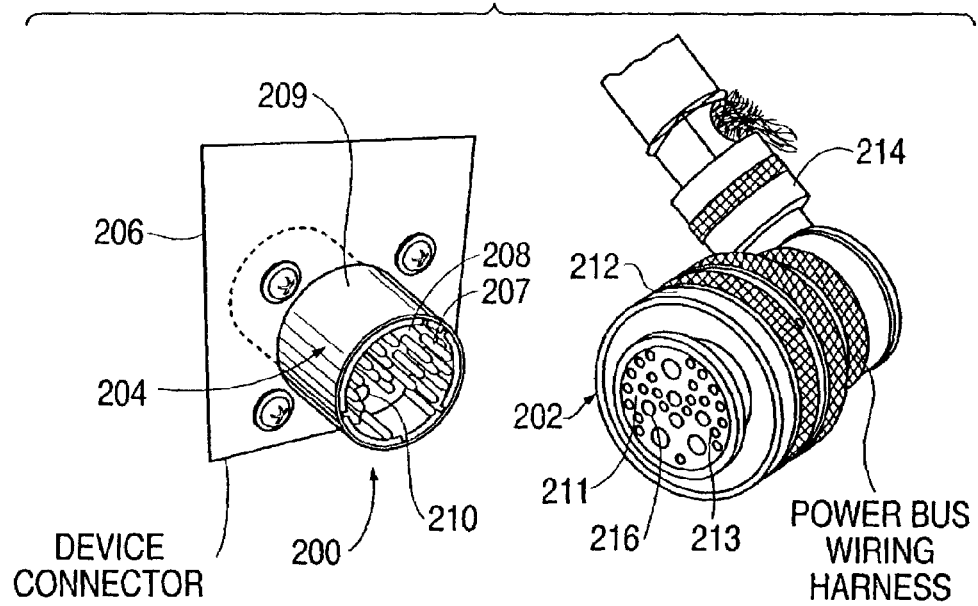
FIG. 1 illustrates a prior art connector having male and female parts for making electrical connection between a power bus of an airframe and a device in the airframe such as avionics.
Figure 5:
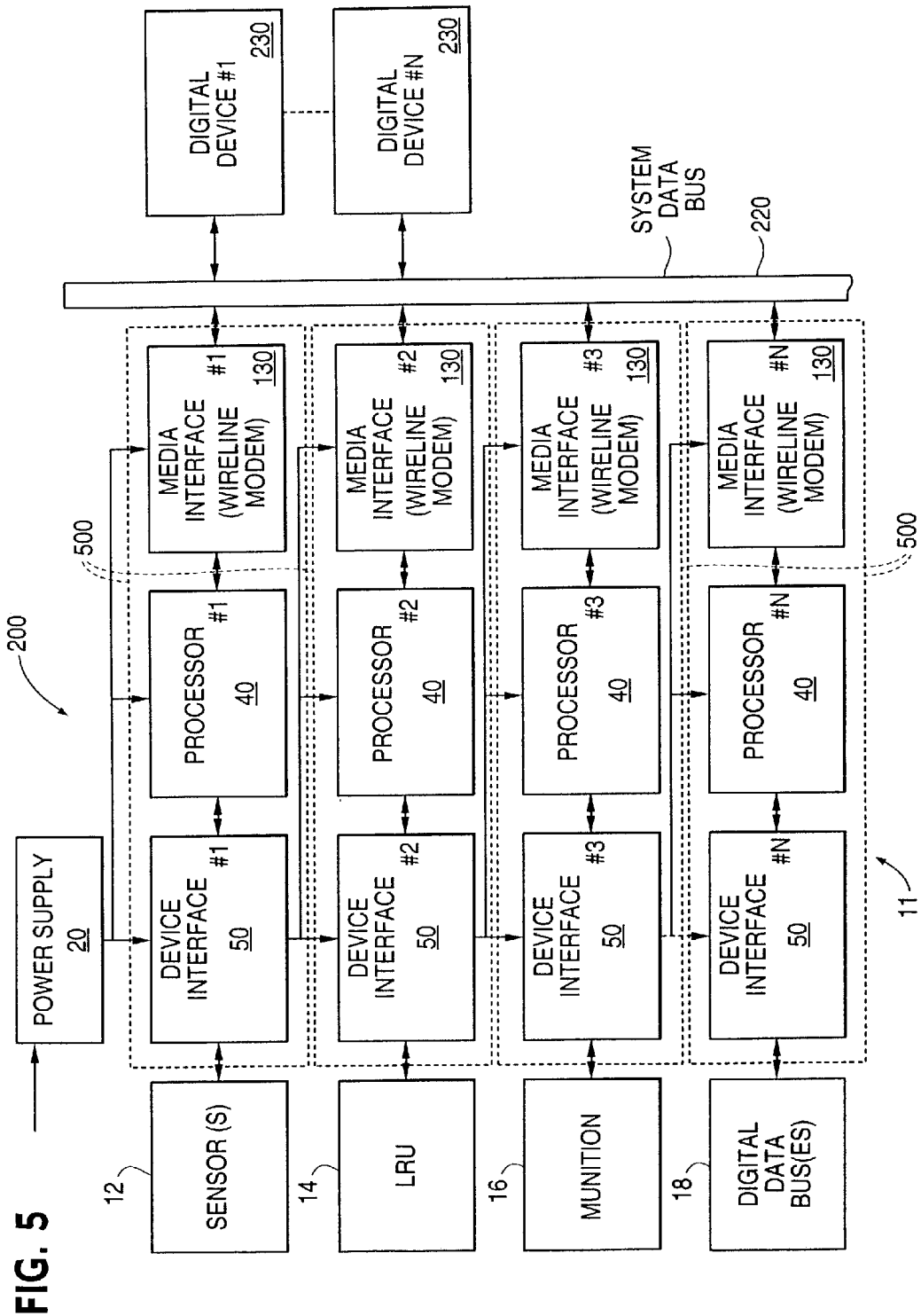
FIG. 5 illustrates second embodiment of the present invention, which transmits data with a system digital data bus.
Figure 7:
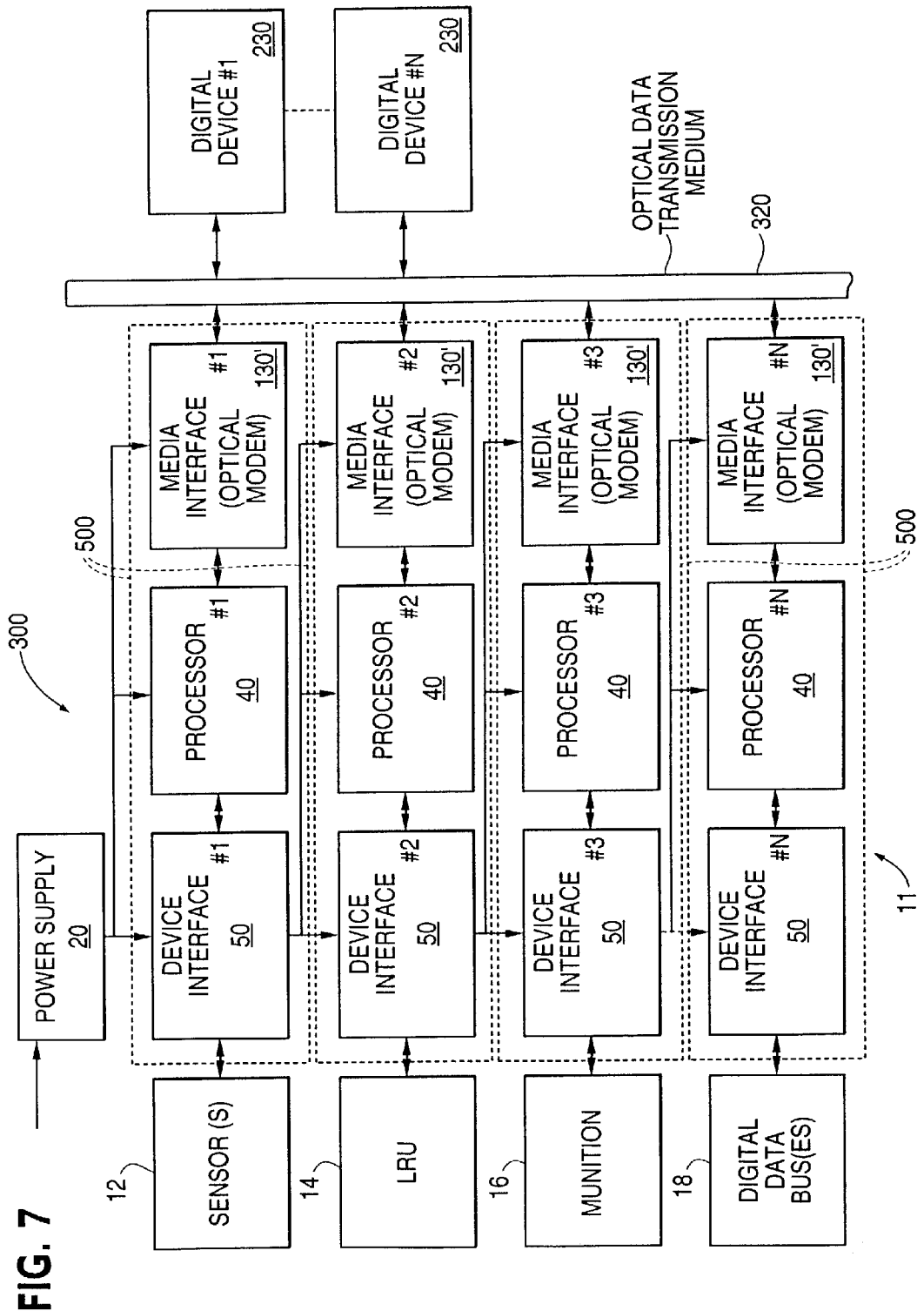
FIG. 7 illustrates a third embodiment of the present invention which transmits data with an optical transmission medium.

FIGS. 3 and 4 respectively illustrate an exploded view of a housing 502 of connection system 500 and the assembled housing, which may be used in accordance with the embodiments of FIGS. 2, 5 and 7, to house the device interface 50, processor 40 and media interface 130 and preferably the power supply 20. The housing 502 is comprised of a lower part 504 and an upper part 506 which are assembled together by connectors (not illustrated). The housing 502 provides a mounting mechanism for a stack of circuit boards 508. The stack of circuit boards 508 may include circuit boards in addition to the device interface 50, processor 40, media interface 130 and power supply. The power supply board 20 provides regulated DC power to each of the circuit boards in the stack 508. The power supply board 20 is coupled to a conductor (not illustrated) providing electrical power to the power supply board. The circuit boards include headers 510 which electrically connect the circuit boards together. The headers 510 also receive a ribbon connector 512 on the end 516 to provide connection to individual devices 12, 14, 16 and 18 and receive a ribbon connector 514 on other end 518 to provide connection to the data transmission media of the embodiments of FIGS. 3, 5 and 7. Each of the housing ends 516 and 518, like the prior art of FIG. 1, has an outer metallic ring 520 containing an insulative rubberized insert 522. Through holes 210 and 216 permit electrical wires 530 to pass through apertures 532 in the stack of circuit boards 508 to maintain electrical isolation between the electrical wires and the individual circuit boards for applications where pass through wiring is desirable. The wires 530 may be for purposes of data transmission or electrical power transmission. A series of arcuate slots 540 is cut into the inner cylindrical surface 542 of the lower and upper parts 504 and 506, which hold the stack of circuit board securely when the lower and upper housing parts are assembled as illustrated in FIG. 4. A device connector 206 is for connection to one of the individual devices 12, 14, 16 and 18 with the connector only being symbolic of the actual connector, which is used. Similarly, the wire bundle 214 is for connection to one of the electrical bus 22 of FIG. 2, the system data bus 220 of FIG. 5 or the optical data transmission medium 320 of FIG. 7 through a suitable interface.

FIG. 5 illustrates a second embodiment 200 of the present invention. The second embodiment 200 differs from the first embodiment 10 in that the connection of sensor(s) 12, LRU(s) 14, munition(s) 16 and digital data bus(es) 18, data interfaces 50, processor 40 and media interface 130 is to a system data bus 220 instead of to the power bus 22 illustrated in FIG. 3. The digital devices 230 communicate to each other over system data bus 220 in accordance with the prior art. The second embodiment 200 utilizes the data transmission protocol utilized by the modems 130 described above with reference to the first embodiment in a manner which does not interfere with the data transmission protocol used for the transmission of digital data between the digital devices 230 over the system data bus 220. Differing data protocols may be used respectively by the media interfaces 130 and the digital devices 230 to achieve non-interference. Without limitation, examples of non-interfering protocols are multiplexing protocols, including multiple access protocols, such as time division multiple access and frequency division multiple access protocols.

Figure 6:
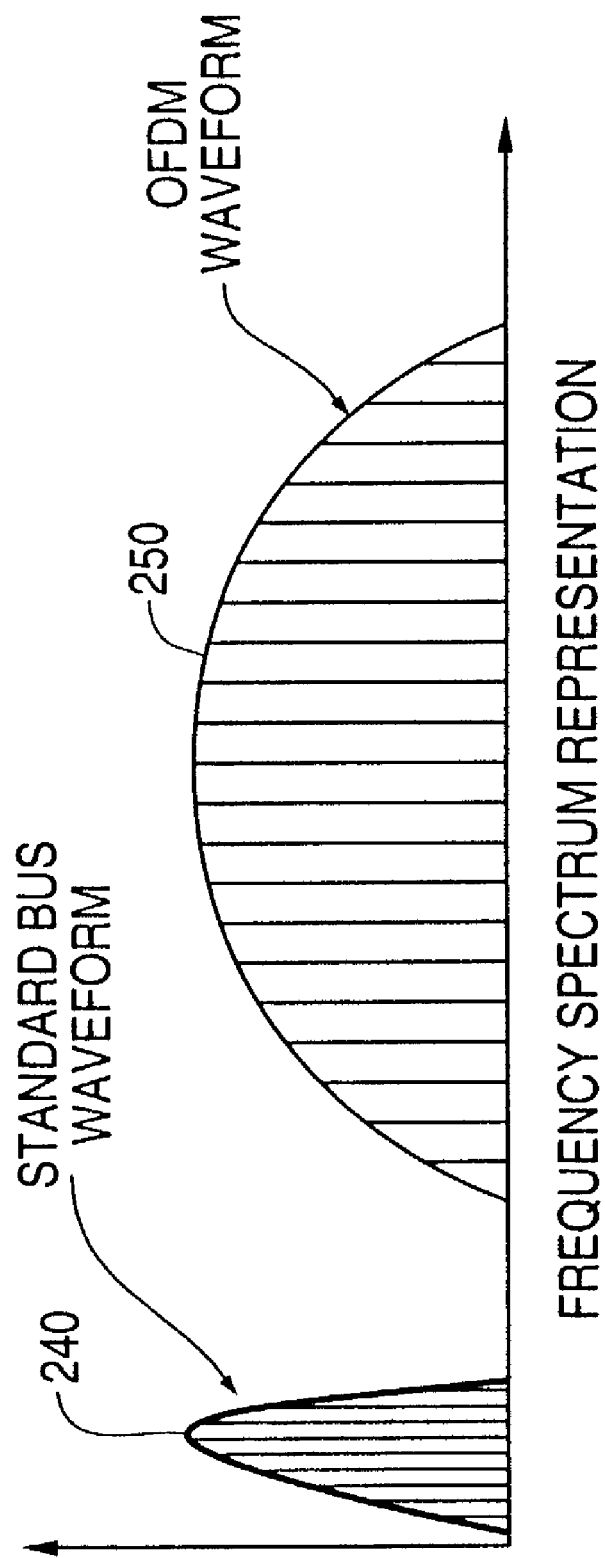
FIG. 6 illustrates an example of the frequency distribution of digital data transmitted with the digital data bus of the second embodiment.

Assuming that the data protocols of the media interfaces 130 and the digital devices 230 are frequency multiplexing protocols, first and second frequency bands 240 and 250 may be used which contain the respective data to prevent interference between the media interfaces 130 and the digital devices 230. As illustrated in FIG. 6, the frequency band 240, which is representative of one frequency spectrum of the digital data transmitted by the digital devices 230 on the system data bus 220 is separated from the frequency band 250 of the digital data transmitted by the media interfaces 130 which is representative of the frequency spectrum of the digital data transmitted from the devices 12, 14, 16 and 18. For example, without limitation, the protocol used for the band 250 may be OFDM with band 250 being higher in frequency than band 240. The connection system of FIGS. 3 and 4 may be used with the embodiment 200 to contain the processor 40, device interfaces 50 and media interfaces 130 and power supply 20 mounted on the stack 508 of circuit boards.

An advantage provided by the second embodiment 200 is that unused data transmission capacity of the system data bus 220 provides the communication needs of the sensor(s) 12, LRU 14, munitions 16, and digital data bus(es) 18, which transmit and receive large amounts of data. The connection of the media interfaces 130, which support the aforementioned data transmitting and receiving functions of the sensor(s) 12, LRU 14, munitions 16 and digital data bus(es) 18, may be physically made by connection to the existing system data bus 220 in any known manner including the connection system 500 of FIGS. 3 and 4. The second embodiment, like the first embodiment, may be used in applications involving add-on devices such as the sensor(s) 12, the LRU 14, munitions 16, or digital data bus(es) 18 in an existing airframe or with the overall fabrication of a new system.

FIG. 7 illustrates a third embodiment 300 of the present invention. The third embodiment 300 differs from the first and second embodiments by using an optical transmission medium 320 instead of an existing power or digital data bus. The system optical data transmission medium 320 permits the connection of the sensor(s) 12, LRU 14, munitions 16, digital data bus(es) 18 and digital devices 230 in the same manner as the first and second embodiments together in a retrofit of an existing system containing the digital devices 230 or fabrication as a new system using the system architecture of device interfaces 50, processors 40 and media interfaces 130'. The media interfaces 130' perform the same function as the media interfaces 130 of the first and second embodiments 10 and 200, except that the modem function is that of modulating and demodulating data, transmitted on an optical medium. The modems may use any known optical data transmission protocol. The connection system 500 of FIGS. 3 and 4 may be used with the modified media interface 130' which supports the transmission of optically transmitted data.

With respect to the use of optical transmission media 320, the wiring harness 214 must be interfaced to optical cable in accordance with well-known connection mechanisms.

The invention has applications to military and commercial aircraft by providing a compact, low cost, and rapid way to extend avionics data bus architectures to support additional aircraft electronics, sensor LRUs and munitions, etc. without new wiring.

The invention also provides avionics bus redundancy through a power bus so that if a primary avionics bus, (not illustrated) is damaged or destroyed, control by sending data transmissions over the system power bus 22 may be maintained.

While the invention has been described in terms of its preferred embodiments, it should be understood that numerous modifications of the invention may be made without departing from the scope of the invention. It is intended that all such modifications fall within the scope of the appended claims.

The invention claimed is:

1. A data transmission system comprising:
   a plurality of modems;
   a transmission medium coupled to each of the modems with data transmissions between the modems being transmitted by the transmission medium with a data transmission protocol;
   a plurality of processors which use a common processor data protocol, each processor being coupled to one of the modems;
   a plurality of devices, each device receiving and/or transmitting data transmissions with a device data protocol and being coupled to a processor;
   a plurality of digital devices, coupled to the transmission medium, which perform at least one of transmitting digital data to the transmission medium for transmission by the transmission medium to another digital device and receiving digital data from another digital device transmitted by the transmission medium; and wherein
   each processor translates data transmissions in a device data protocol received from a device into the common processor data protocol which are transmitted to a modem coupled thereto and translates data transmissions received from the modem coupled thereto in the common processor data protocol into the device data protocol of the device coupled thereto which is transmitted to the device coupled thereto and each modem modulates data transmissions received from the processor coupled thereto into the data transmission protocol which are transmitted by the transmission medium and demodulates data transmissions received from another modem in the data transmission protocol into the common processor data protocol and transmits the data transmission in the common processor data protocol to the processor coupled thereto and data transmissions on the transmission medium using the data transmission protocol do not interfere with data transmissions on the transmission medium between the plurality of digital devices.

2. A system in accordance with claim 1 wherein:
   the transmission of digital data on the transmission medium between the digital devices is separated in frequency from the transmission of data by the transmission medium using the data transmission protocol.

3. A system in accordance with claim 2 wherein:
   the digital data transmitted on the transmission medium between the digital devices is in a first frequency band and the transmission of data by the transmission medium using the data transmission protocol is in a second frequency band different from the first frequency band.

4. A system in accordance with claim 3 wherein:
   the first frequency band is lower in frequency than the second frequency band.

5. A system in accordance with claim 4 wherein:
   the data transmission protocol is orthogonal frequency division multiplexing.

6. A system in accordance with claim 5 wherein:
   the transmission medium is a digital data bus.

7. A system in accordance with claim 2 wherein:
   the transmission medium is a digital data bus.

8. A system in accordance with claim 2 comprising:
   a plurality of device interfaces, each device interface being coupled to a device and a processor and modifying timing of data transmissions between the device and processor coupled thereto and/or buffering the data transmissions between the device and the processor coupled thereto.

9. A system in accordance with claim 8 wherein:
   each device interface converts data transmission outputs from the device coupled thereto into a configuration to match integrated circuit inputs of the processor coupled to the interface.

10. A system in accordance with claim 3 wherein:
    the transmission medium is a digital data bus.

11. A system in accordance with claim 3 comprising:
    a plurality of device interfaces, each device interface being coupled to a device and a processor and modifying timing of data transmissions between the device and processor coupled thereto and/or buffering the data transmissions between the device and the processor coupled thereto.

12. A system in accordance with claim 11 wherein:
    each device interface converts data transmission outputs from the device coupled thereto into a configuration to match integrated circuit inputs of the processor coupled to the interface.

13. A system in accordance with claim 4 wherein:
    the transmission medium is a digital data bus.

14. A system in accordance with claim 1 wherein:
    the transmission medium is a digital data bus.

15. A system in accordance with claim 14 comprising:
    a plurality of device interfaces, each device interface being coupled to a device and a processor and modifying timing of data transmissions between the device and processor coupled thereto and/or buffering the data transmissions between the device and the processor coupled thereto.

16. A system in accordance with claim 15 wherein:
    each device interface converts data transmission outputs from the device coupled thereto into a configuration to match integrated circuit inputs of the processor coupled to the interface.

17. A system in accordance with claim 1 comprising:
    a plurality of device interfaces, each device interface being coupled to a device and a processor and modifying timing of data transmissions between the device and processor coupled thereto and/or buffering the data transmissions between the device and the processor coupled thereto.

18. A system in accordance with claim 17 wherein:
    each device interface converts data transmission outputs from the device coupled thereto into a configuration to match integrated circuit inputs of the processor coupled to the interface.

19. A system in accordance with claim 1 wherein:
    the common processor data protocol is IP.

20. A system in accordance with claim 1 wherein:
the device data protocol is RS-422.

21. A system in accordance with claim 1 wherein:
the device data protocol is MIL-STD-1553.

22. A system in accordance with claim 1 wherein:
the device data protocol is MIL-STD-1760.

23. A system in accordance with claim 1 wherein: the device data protocol is ARINC 429.

24. A system in accordance with claim 1 wherein:
the transmission medium is on an airframe; and the devices and digital devices are equipment of the airframe.

25. A system in accordance with claim 24 wherein:
the devices are munitions.

26. A system in accordance with claim 24 wherein:
the devices are avionics.

27. A system in accordance with claim 1 wherein:
the transmission medium is an optical transmission medium.

28. A method of data transmission using a data transmission system including a plurality of modems, a transmission medium coupled to each of the modems with data transmissions between the modems being transmitted by the transmission medium using a data transmission protocol, a plurality of processors which use a common processor data protocol, each processor being coupled to one of the modems, a plurality of devices, each device receiving and/or transmitting data transmissions with a device data protocol and being coupled to a processor, and a plurality of digital devices coupled to the transmission medium which perform at least one of transmitting digital data to the transmission medium for transmission by the transmission medium to another digital device and receiving digital data from another digital device transmitted by the transmission medium comprising:
each processor translating data transmissions in a device data protocol received from a device into the common processor data protocol which are transmitted to a modem coupled thereto and translating data transmissions received from the modem in the common processor data protocol into the device data protocol of the device coupled thereto which is transmitted to the device coupled thereto; and
each modem modulates data transmissions received from the processor coupled thereto into the data transmission protocol which are transmitted by the transmission medium and demodulates data transmissions received from another modem in the data transmission protocol into the common processor data protocol and transmits the data transmissions in the common processor data protocol to the processor coupled thereto and wherein data transmissions on the transmission medium using the data transmission protocol do not interfere with the data transmissions on the transmission medium between the plurality of digital devices.

29. A method in accordance with claim 28 wherein:
the transmission of digital data on the transmission medium between the digital devices is separated in frequency from the transmission of data by the transmission medium using the data transmission protocol.

30. A method in accordance with claim 29 wherein:
the digital data is transmitted on the transmission medium between the in a first frequency band and the transmission of data by the transmission medium using the data transmission protocol is in a second frequency band different from the first frequency band.

31. A method in accordance with claim 30 wherein:
the first frequency band is lower in frequency than the second frequency band.

32. A method in accordance with claim 31 wherein:
the data transmission protocol is orthogonal frequency division multiplexing.

33. A method in accordance with claim 32 wherein:
the transmission medium is a digital data bus.

34. A method in accordance with claim 29 wherein:
the transmission medium is a digital data bus.

35. A method in accordance with claim 29 comprising:
a plurality of device interfaces, each device interface being coupled to a device and a processor and modifying timing of data transmissions between the device and processor coupled thereto and/or buffering the data transmissions between the device and the processor coupled thereto.

36. A method in accordance with claim 35 wherein:
each device interface converts data transmission outputs from the device coupled thereto into a configuration to match integrated circuit inputs of the processor coupled to the interface.

37. A method in accordance with claim 30 wherein:
the transmission medium is a digital data bus.

38. A method in accordance with claim 30 comprising:
a plurality of device interfaces, each device interface being coupled to a device and a processor and modifying timing of data transmissions between the device and processor coupled thereto and/or buffering the data transmissions between the device and the processor coupled thereto.

39. A method in accordance with claim 38 wherein:
each device interface converts data transmission outputs from the device coupled thereto into a configuration to match integrated circuit inputs of the processor coupled to the interface.

40. A method in accordance with claim 31 wherein:
the transmission medium is a digital data bus.

41. A method in accordance with claim 28 wherein:
the transmission medium is a digital data bus.

42. A method in accordance with claim 41 comprising:
a plurality of device interfaces, each device interface being coupled to a device and a processor and modifying timing of data transmissions between the device and processor coupled thereto and/or buffering the data transmissions between the device and the processor coupled thereto.

43. A method in accordance with claim 42 wherein:
each device interface converts data transmission outputs from the device coupled thereto into a configuration to match integrated circuit inputs of the processor coupled to the interface.

44. A method in accordance with claim 28 comprising:
a plurality of device interfaces, each device interface being coupled to a device and a processor and modifying timing of data transmissions between the device and processor coupled thereto and/or buffering the data transmissions between the device and the processor coupled thereto.

45. A method in accordance with claim 44 wherein:
each device interface converts data transmission outputs from the device coupled thereto into a configuration to match integrated circuit inputs of the processor coupled to the interface.

46. A method in accordance with claim 28 wherein:
the common processor data protocol is IP.

47. A method in accordance with claim 28 wherein:
the device data protocol is RS-422.
48. A method in accordance with claim 28 wherein:
the device data protocol is MIL-STD-1553.
49. A method in accordance with claim 28 wherein:
the device data protocol is MIL-STD-1760.
50. A method in accordance with claim 28 wherein:
the device data protocol is ARINC 429.
51. A method in accordance with claim 28 wherein:
the transmission medium is on an airframe; and
the devices and digital devices are equipment of the airframe.
52. A method in accordance with claim 28 wherein:
the devices are munitions.
53. A method in accordance with claim 28 wherein:
the devices are avionics.
54. A method in accordance with claim 28 wherein:
the transmission medium is an optical transmission medium.
55. A data transmission system comprising:
a plurality of modems;
a transmission medium coupled to each of the modems with data transmissions between the modems being transmitted by the transmission medium with a data transmission protocol;
a plurality of processors which use a common processor data protocol, each processor being coupled to one of the modems; and
a plurality of devices, each device receiving and/or transmitting data transmissions with a device data protocol and being coupled to a processor;
a plurality of digital devices, coupled to the transmission medium, which perform at least one of transmitting digital data to the transmission medium for transmission by the transmission medium to another digital device and receiving digital data from another digital device transmitted by the transmission medium; and wherein
each processor translates data transmissions in a device data protocol received from a device into the common processor data protocol which are transmitted to a modem coupled thereto and translates data transmissions received from the modem coupled thereto in the common processor data processor protocol into the device data protocol of the device coupled thereto which is transmitted to the device coupled thereto and each modem modulates data transmissions received from the processor coupled thereto into the data transmission protocol which are transmitted by the transmission medium and demodulates data transmissions received from another modem in the data transmission protocol into the common processor data protocol and transmits the data transmission in the common processor data protocol to the processor coupled thereto, and the transmission of digital data on the transmission medium between the digital devices is separated in frequency from the transmission of data by the transmission medium using the data transmission protocol.
56. A system in accordance with claim 55 wherein:
the transmission medium is one of a power bus, a digital data bus, and an optical transmission bus.
57. A system in accordance with claim 55 wherein:
the digital data transmitted on the transmission medium between the digital devices is in a first frequency band and the transmission of data by the transmission medium using the data transmission protocol is in a second frequency band different from the first frequency band.
58. A system in accordance with claim 55 wherein:
a plurality of device interfaces, each device interface being coupled to a device and a processor and modifying timing of data transmissions between the device and processor coupled thereto and/or buffering the data transmissions between the device and the processor coupled thereto.
59. A method of data transmission using a data transmission system including a plurality of modems, a transmission medium coupled to each of the modems with data transmissions between the modems being transmitted by the transmission medium using a data transmission protocol, a plurality of processors which use a common processor data protocol, each processor being coupled to one of the modems, a plurality of devices, each device receiving and/or transmitting data transmissions with a device data protocol and being coupled to a processor, and a plurality of digital devices coupled to the transmission medium which perform at least one of transmitting digital data to the transmission medium for transmission by the transmission medium to another digital device and receiving digital data from another digital device transmitted by the transmission medium, comprising:
each processor translating data transmissions in a device data protocol received from a device into the common processor data protocol which are transmitted to a modem coupled thereto and translating data transmissions received from the modem in the common processor data protocol into the device data protocol of the device coupled thereto which is transmitted to the device coupled thereto; and each modem modulates data transmissions received from the processor coupled thereto into the data transmission protocol which are transmitted by the transmission medium and demodulates data transmissions received from another modem in the data transmission protocol into the common processor data protocol and transmits the data transmissions in the common processor data protocol to the processor coupled thereto, and the transmission of digital data on the transmission medium between the digital devices is separated in frequency from the transmission of data by the transmission medium using the data transmission protocol.
60. A method in accordance with claim 59 wherein:
the transmission medium is one of a power bus, a digital data bus, and an optical transmission bus.
61. A method in accordance with claim 59 wherein:
the digital data transmitted on the transmission medium between the digital devices is in a first frequency band and the transmission of data by the transmission medium using the data transmission protocol is in a second frequency band different from the first frequency band.
62. A method in accordance with claim 59 wherein:
a plurality of device interfaces, each device interface being coupled to a device and a processor and modifying timing of data transmissions between the device and processor coupled thereto and/or buffering the data transmissions between the device and the processor coupled thereto.

* * * * *